United States Patent [19]

Gibbard et al.

[11] 4,439,500
[45] Mar. 27, 1984

[54] GAS SWITCH

[75] Inventors: Henry F. Gibbard, Schaumburg; Richard C. Murray, Palatine; Jay M. Cech, Elmhurst, all of Ill.

[73] Assignee: Gould Inc., Rolling Meadows, Ill.

[21] Appl. No.: 402,382

[22] Filed: Jul. 27, 1982

[51] Int. Cl.$^3$ ............................................ H01M 12/06
[52] U.S. Cl. ........................................ 429/27; 429/53; 429/56
[58] Field of Search ..................... 429/53, 54, 56, 27, 429/86

[56] References Cited

U.S. PATENT DOCUMENTS

| 645,547 | 3/1900 | Botz | 429/86 |
|---|---|---|---|
| 2,797,254 | 6/1957 | Schumacher et al. | 136/177 |
| 3,100,165 | 8/1963 | Chapman | 136/177 |
| 3,218,197 | 11/1965 | Charmichael et al. | 136/133 |
| 3,398,026 | 8/1968 | Andre | 136/178 |
| 3,585,082 | 6/1971 | Siller et al. | 136/178 |
| 3,741,812 | 6/1973 | Spellman et al. | 136/107 |
| 3,897,265 | 7/1975 | Jaggard | 136/86 A |
| 3,904,441 | 9/1975 | Badger et al. | 136/177 |
| 4,093,105 | 6/1978 | Russell et al. | 220/373 |
| 4,262,062 | 4/1981 | Zatsky | 429/27 |

FOREIGN PATENT DOCUMENTS 1518337 2/1968 France .................. 429/86

*Primary Examiner*—Donald L. Walton
*Attorney, Agent, or Firm*—John R. Garrett; John C. Tiernan; Edward F. Sachs

[57] ABSTRACT

The disclosure depicts a novel gas switch comprising a membrane having at least one passageway separating a first gas containing region from a second gas containing region. The gas switch also comprises a liquid having a low vapor pressure contained at least within the passageway of the membrane. The liquid is contained in the passageway when a pressure difference between the first and second regions is less than a first predetermined value, thereby preventing a gas exchange between the first and second regions. When the pressure difference across the membrane exceeds a second predetermined value the liquid substantially flows out of the passageway, thereby opening the passageway for a gas exchange between the first and second regions; and when the pressure difference across the membrane is reestablished at a value less than the first predetermined value, the fluid flows back into the passageway thereby closing the passageway and ending the gas exchange between the first and second region. In some embodiments the first predetermined value of pressure may be substantially identical to the second predetermined value of pressure.

10 Claims, 10 Drawing Figures

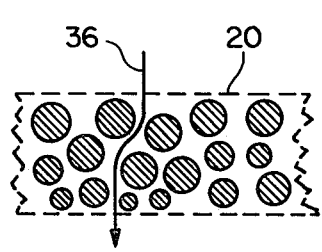
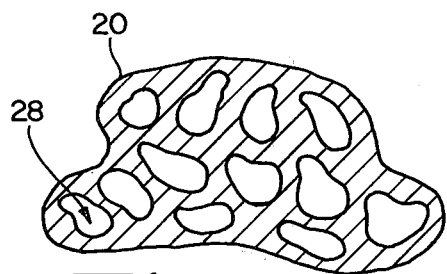
Fig. 1  Fig. 2
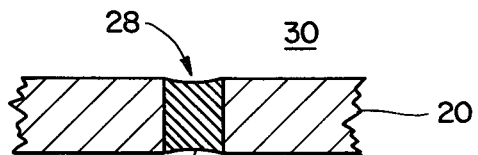
Fig. 3
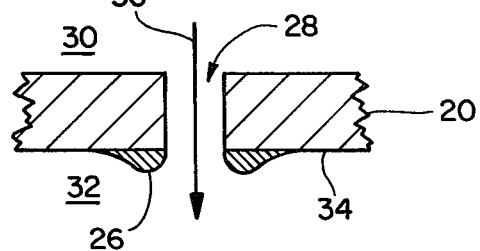
Fig. 4
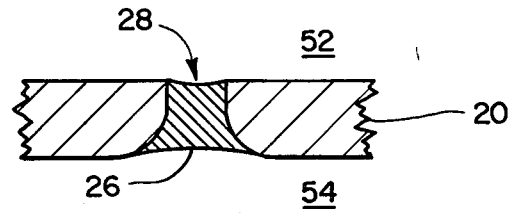
Fig. 5
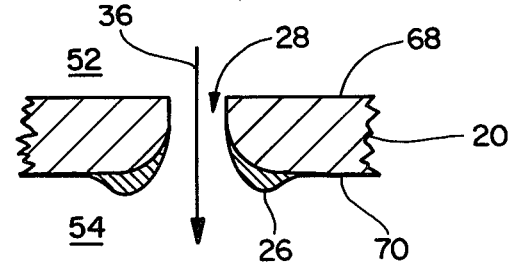
Fig. 6

4,439,500

GAS SWITCH

BACKGROUND OF THE INVENTION

The present invention relates in general to gas switches for selectively providing a gas exchange between at least two defined regions and, in particular, to a gas switch for use in an air cell battery.

U.S. Pat. No. 3,897,265 discloses a conventional air cell battery or gas depolarized electrochemical cell. The air cell battery disclosed is of the type known as a zinc air button cell. Conventionally, this type of button cell uses an active material such as amalgamated zinc and a cathode material such as carbon black with a catalyst and a hydrophobic binder dispersed throughout the cathode. In operation, when electricity is drawn from the battery, oxygen within the battery is used up by the cathode material and new oxygen is admitted into the battery through openings in the housing of the battery. A serious disadvantage of these batteries is that because of the opening in the housing the battery may lose or gain water depending upon the humidity content of the air surrounding the battery. Such gain or loss of water from the battery is detrimental to the operation of the battery. Typically normal changes in humidity seriously shorten the usable length of the battery.

OBJECT OF THE INVENTION

It is a general object of the present invention to provide an improved gas switch for exchanging gas between two defined regions.

It is a more particular object of the present invention to provide a gas switch for use in air cell batteries.

It is a further object of the present invention to provide an air cell battery which is closed to the environment when not in use.

It is another object of the present invention to provide an air cell battery which has a reduced rate of water loss or gain, while still allowing the proper oxygen exchange.

It is another object of the present invention to provide a gas switch for use in an air cell battery which requires no external energy source to activate the gas switch.

It is yet another object of the present invention to provide an air cell battery which is inexpensive and easily fabricated.

BRIEF DESCRIPTION OF THE DRAWINGS

The features of the present invention which are believed to be novel are set forth with particularity in the appended claims. The invention together with further objects and advantages may best be understood by reference to the following description taken in conjunction with the accompanying drawing, in the several figures of which like referenced numerals identify like elements, and in which:

FIG. 1 is a cross-sectional side view of a portion of a novel gas switch.

FIG. 2 is a top view of the FIG. 1 gas switch.

FIG. 3 is a side view of an equivalent representation of the FIG. 1 gas switch in a closed position.

FIG. 4 is a side view of the FIG. 3 gas switch in an open position.

FIG. 5 is a side view of another embodiment of the novel gas switch in the closed position.

FIG. 6 is a side view of the FIG. 5 gas switch in the open position.

DESCRIPTION OF A PREFERRED EMBODIMENT

Figure 9:
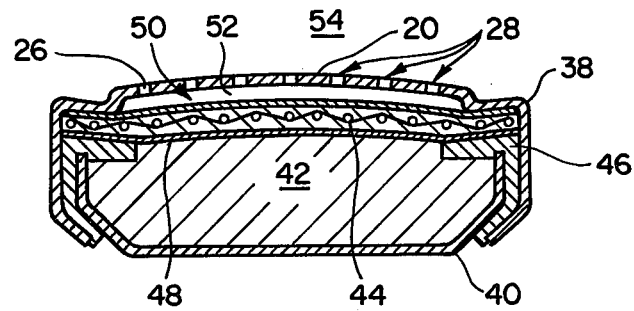
FIG. 9 is a cross-sectional view of an air cell battery utilizing the novel gas switch.
Figure 10:
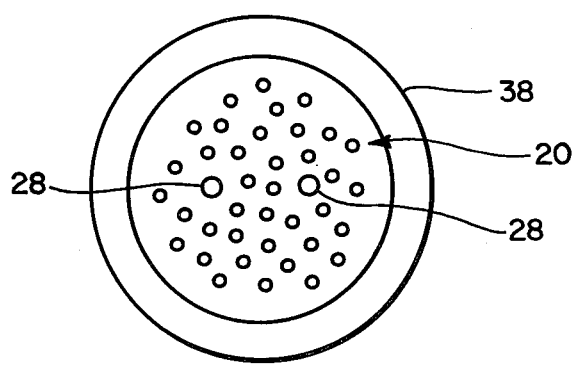
FIG. 10 is a top view of the FIG. 9 air cell battery.

Whereas an invention may be implemented in a wide variety of devices the novel gas switch is preferably embodied in an air celll of the type shown in FIGS. 9 and 10. The novel gas switch when used in conjunction with an air cell battery permits the battery to be closed to the environment when electrical current is not being drawn from the battery. This reduces the rate of water loss or gain from the battery, while still allowing the proper oxygen exchange with the atmosphere when the battery is in use. Another advantage of the novel gas switch is that it requires no external energy source to activate the gas switch. It will be obvious that the novel gas switch has a wide range of applications even outside of the field of air cell batteries.

In general terms the novel gas switch comprises a membrane having at least one passageway separating a first gas containing region from a second gas containing region. The gas switch also comprises a liquid having a low vapor pressure contained at least within the passageway of the membrane. The liquid is contained in the passageway when a pressure difference between the first and second regions is less than a first predetermined value, thereby preventing a gas exchange between the first and second regions. When the pressure difference across the membrane exceeds a second predetermined value the liquid flows substantially out of the passageway, thereby opening the passageway for a gas exchange between the first and second regions; and when the pressure difference across the membrane is reestablished at a value less than the first predetermined value, the fluid flows back into the passageway thereby closing the passageway and ending the gas exchange between the first and second region. In some embodiments the first predetermined value of pressure may be substantially identical to the second predetermined value of pressure.

FIG. 1 is a cross-sectional cutaway side view of a portion of a membrane 20 and FIG. 2 shows a top view of a membrane 20 having apertures 22 in the top surface 24 of the membrane 20. The membrane 20 may be constructed of any one of a large number of different materials and for the present example the material is a filter paper. The membrane 20 is soaked with a liquid 26 such as paraffin oil which has a low vapor pressure. In the present example the membrane 20 has a plurality of passageways 28, indicated by the arrow in FIG. 1.

In order to more easily describe the operation of the novel gas switch an equivalent schematic representation is shown in FIG. 3. The FIG. 3 representation shows the membrane 20 having one passageway 28 containing the liquid 26. The membrane 20 separates a first gas containing region 30 from a second gas containing region 32. When the pressure difference between the first and second regions 30 and 32 is less than a first predetermined value the liquid 26 is contained at least within the passageway 28 of the membrane 20 as shown in FIG. 3.

This prevents any gas exchange between the first and second regions 30 and 32.

When the pressure difference across the membrane 20 exceeds a second predetermined value the liquid 26 flows out of the passageway 28 onto surface 34 of the membrane 20, thereby opening the passageway 28 for a gas exchange between the first and second regions 30 and 32. The gas exchange is indicated by the arrow 36 in FIG. 4. When the pressure difference across the membrane 20 is reestablished at a value less than the first predetermined value, the fluid 26 flows back into the passageway 28, at least by capillary action, thereby closing the passageway 28 and ending the gas exchange 36 between the first and second regions 30 and 32.

A cross sectional view of an air cell battery is shown in FIG. 9. The air cell battery is constructed of a cathode casing 38, an anode casing 40, an anode material 42, a cathode material 44 and an insulator 46 located between the cathode casing 40 and the anode casing 42. A separator 48 is positioned between the anode material 42 and cathode material 44. The membrane 20 is positioned over an opening 50 in the cathode casing 38. The cathode casing 38 and the anode casing 40 form a housing for the air cell battery. In the embodiment depicted the membrane 20 has a plurality of passageways 28. FIG. 10 shows a top view of the air cell battery. It is to be understood that in an embodiment where the membrane 20 is constructed of a material such as filter paper, the passageways 28 would be microscopic in size. The membrane 20 and the housing formed by the cathode casing 38 and anode casing 40 define an inner region 52 within the housing and an outer region 54 external to the housing.

When electrical current is being drawn from the air cell battery, oxygen contained within the inner region 52 is used by the cathode material 44. This decrease of oxygen within the inner region 52 causes a pressure difference across the membrane 20. When this pressure difference across the membrane 20 is greater than a second predetermined value, the liquid 26 which was originally contained within the passageway 28, of the membrane 20 flows out of the passageways 28 thereby allowing oxygen from the outer region 54 to move into the inner region 52. When the air cell battery ceases to supply electrical current the pressure difference becomes less than a first predetermined value and the liquid 26 flows back into the passageways 28 thereby closing the passageway 28. The liquid 26 flows out of the passageways 28 when the pressure difference across the membrane 20 exceeds a second predetermined value and flows back into the passageways 28 when the pressure difference is less than the first predetermined value.

Figure 7:
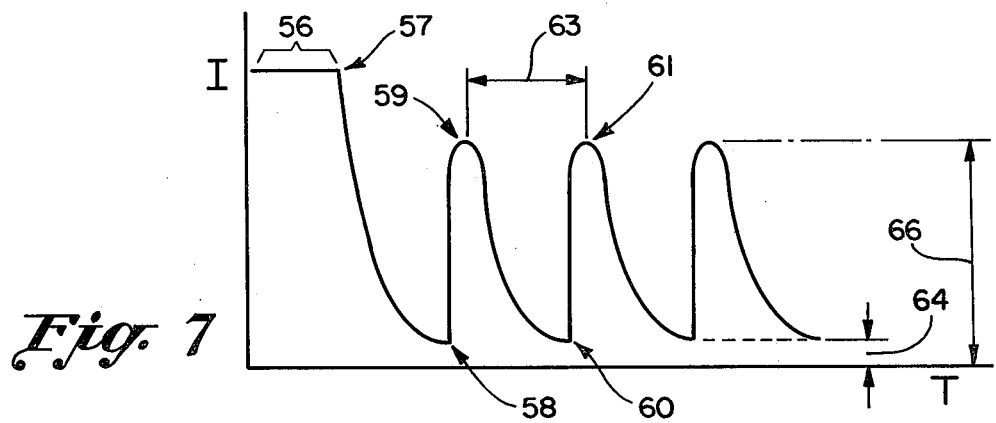
FIG. 7 is a graph depicting the operation of the FIGS. 3 and 4 gas switch.

In a first embodiment of the present invention the membrane 20 is made of a material having a tradename of Gelman VP 3000 which is an acrylic copolimer filter membrane of approximately 9 mil thickness. The filter membrane has an average hole size of 3 microns. The liquid used with this membrane is a fluoroether having a tradename of Dupont E-9. A graph of the operation of an air cell battery utilizing this membrane and liquid is depicted in FIG. 7. The FIG. 7 graph is a plot of current drawn from the battery against time. In order to better understand the operation of the air cell battery the graph has not been drawn to scale. A first section 56 of the plot shows the current drawn from the battery when the membrane is not in place and for this embodiment the current is approximately 15 milliamps. At point 57 of the plot the membrane with the liquid contained in the passageways is attached to the air cell battery. As oxygen is used up within the air cell battery the current decreases until a level 64 of 20 microamps is reached at point 58. At this point 58 the pressure difference across the membrane exceeds the second predetermined value, the fluid flows out of the passageways and the membrane now allows oxygen to pass to the inner region of the air cell battery. As oxygen becomes available to the battery the current increases until point 59 is reached which for the present embodiment is a current level 66 of approximately 1 milliamp. At point 59 the pressure difference across the membrane has become less than the first predetermined value and therefore the fluid flows back into the passageways of the membrane closing the passageways and ending the oxygen exchange between the first and second regions. As the battery continues to operate and electrical current is drawn the current once again decreases until point 60 is reached when once again the passageways in the membrane are open for oxygen to enter. The air cell battery will continue to operate in this cyclic manner alternating between applying 20 microamps of current and 1 milliamp of current. In the present embodiment the time between points 59 and 61 of the resulting wave form is approximately 6 minutes. Although some applications may require a current supply which alternates in a manner depicted in FIG. 7, other applications require a current which has an insignificant amount of variation in amplitude. Similar characteristics of operation to those depicted in FIG. 7 were obtained for an air cell battery which utilized the membrane of filter paper and a paraffin oil liquid. Numerous other type of membranes and liquids can be utilized to produce different levels of current output and different current waveforms.

An alternate embodiment of the present invention is illustrated in FIGS. 5 and 6. In this embodiment polypropolene was used for the membrane 20 and paraffin oil was used for the liquid 26. The membrane 20 has a thickness of approximately 1/16 inch and the passageway 28 formed in the membrane 20 has the geometry shown in FIGS. 5 and 6. The passageway 28 is a circular hole with a diameter of 0.3 mm on a first side 68 of the membrane 20 and a diameter of 1.5 mm on a second side 70. Between the first and second sides 68 and 70 the hole changes in diameter from 0.3 mm to 1.5 mm. The second side 70 of the membrane 20 is located adjacent to the inner region 52 of the air cell battery. Because of the hole geometry, when the liquid 26 opens the passageway 28 it is located partially on the second side 70 and partially in the passageway as shown in FIG. 6. This facilitates the closing of the passageway 28 when holes of this relatively large size are used. Various other hole geometrics could be utilized.

Figure 8:
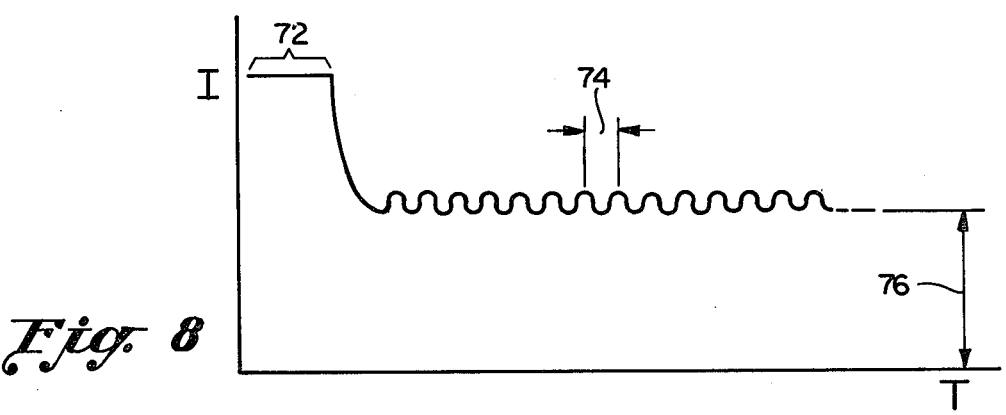
FIG. 8 is a graph depicting the operation of the FIGS. 5 and 6 gas switch.

The graph in FIG. 8 illustrates the operation of the FIG. 5 and 6 embodiment. Portion 72 represents the amount of current (15 milliamps) drawn from the battery before the membrane 20 is attached. After the membrane is attached a "rippled" current is observed indicating that although the passageways 28 still open and close the oxygen exchange is such that the amplitude variations in current are much less than in the FIG. 7 embodiment. The current level 74 is approximately 5.0 milliamps and the time 76 between peaks is approximately 1.5 minutes.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. An air cell battery comprising:
   an anode casing containing anode material and a cathode casing containing cathode material, said cathode casing having an opening;
   an insulator located between and attached to said anode casing, and said cathode casing and a separator positioned between said anode material and said cathode material;
   a bidirectional gas switch comprising;
   a single membrane covering said opening in said cathode casing, said membrane having at least first and second sides and having at least one formed passageway having a predetermined geometry, said membrane and said cathode and anode casings thereby defining an inner region within said air cell battery and an outer region external to the air cell battery;
   a liquid having a low vapor pressure contained at least within said passageway of said membrane when a pressure difference across said membrane between said inner and outer regions is less than a first predetermined value, thereby preventing an exchange of gas between said inner region and said outer region, said liquid flowing substantially out of said passageway and onto a side of said membrane adjacent said gas containing region having a lower pressure value when the air cell battery supplies electrical current and oxygen is extracted from said inner region to cause said pressure difference across said membrane to exceed a second predetermined value thereby opening said passageway and allowing oxygen from said outer region to move into said inner region,
   and wherein, when the air cell battery ceases to supply electrical current, said pressure difference becomes less than said first predetermined value and said liquid flows back into said passageway thereby closing said passageway.

2. The apparatus described in claim 1 wherein said membrane is porous and has a plurality of passageways.

3. The apparatus defined in claim 2 wherein said passageways are microscopic.

4. The apparatus described in claim 1 wherein said passageway is a substantially circular hole having a diameter of approximately 0.3 mm.

5. The apparatus described in claim 1 wherein said passageway has a smaller geometric cross sectional area on one side of said membrane than on the other side of said membrane.

6. The apparatus described in claim 5 wherein said passageway is a substantially circular hole having a diameter of approximately 0.3 mm on a first side of said membrane and a diameter of approximately 1.5 mm on a second side of said membrane, the cross sectional shape of said hole changing from 0.3 mm in diameter to 1.5 mm in diameter between said first and second sides of said membrane.

7. The apparatus described in claim 1 wherein said membrane is polypropylene.

8. The apparatus described in claim 1 wherein said liquid is paraffin oil.

9. The apparatus described in claim 1 wherein said liquid flows into and out of said passageway in a cyclic manner when oxygen is continually removed from said inner region.

10. The apparatus described in claim 1 wherein said first predetermined value of pressure difference is substantially equal to said second predetermined value of pressure difference.

* * * * *